June 2, 1964   A. P. INGRASSIA   3,135,625
METHOD FOR APPLYING CATALYZED COATING COMPOSITIONS
Filed Aug. 29, 1958
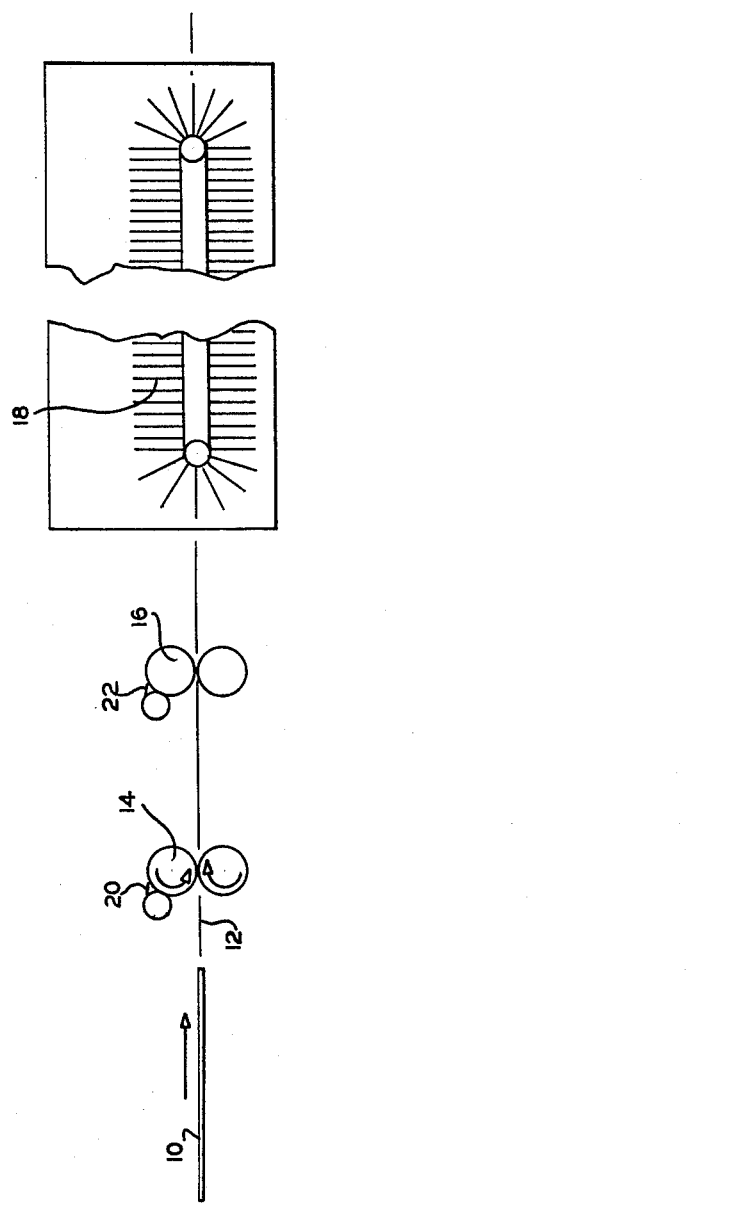
INVENTOR
ANGELO P. INGRASSIA
BY
ATTORNEY

United States Patent Office 3,135,625
Patented June 2, 1964

3,135,625
METHOD FOR APPLYING CATALYZED
COATING COMPOSITIONS
Angelo P. Ingrassia, Laurel, Miss., assignor to Masonite
Corporation, Laurel, Miss., a corporation of Delaware
Filed Aug. 29, 1958, Ser. No. 758,133
4 Claims. (Cl. 117—62.2)

The present invention relates to a novel method for applying coating compositions to flat sheet articles. More particularly, the invention relates to a method of applying to flat sheet articles coating compositions which at the time of application are mixed with a suitable catalyst and a similarly suitable accelerator therefor.

During recent years there have been developed a number of coating compositions which require that a catalyst and an accelerator or promoter be accurately mixed therewith at the time of application of the coating. Usually, the compositions have been applied by spraying. The employment of multiple catalysts has necessitated the use of double-nozzle spray guns or similar equipment which has mingled the coating compositions and different catalysts in spray form or, at least, has enabled their mixing at the time of application. This requirement stems from the fact that the catalyzed coating compositions have extremely short pot life and premature gelling thereof can only be prevented by maintaining the components separately until their application.

It has been found, however, that in coating flat sheet articles such as hardboard sheets, metal sheets, and the like articles, spraying of the coating composition has resulted in excessive waste and the requirement for recovery of excess coating material. It is much more desirable to coat the flat sheets by means of roll applicators inasmuch as the film applied is capable of more accurate control and the coated article presents a greatly improved appearance as well.

It is therefore a primary object of the invention to provide a novel method for the roll application to flat sheet articles of coating compositions requiring the use of mixed catalysts.

Another object of the invention resides in the provision of a novel method for obtaining thorough and accurate mixing of the coating composition, catalyst, and accelerator while, at the same time, preventing premature gelling of the composition.

A further object of the invention resides in the provision of roll applicator means which prevent the intermixing of catalyst and accelerator during the application of fast setting resinous compositions. Other objects of the invention will become apparent from the following detailed description thereof.

The invention will be described with particular reference to the accompanying drawing which presents a schematic diagram of the apparatus employed in the novel method of coating composition application.

The method is carried out by traveling a flat sheet article 10 along the conveyor 12 and passing the sheet beneath the coating rolls 14 and 16 and thence desirably to a wicket-type conveyor 18 which serves to slow the succession of coated sheets while, at the same time, permitting the film of coating composition to cure to substantial dryness.

It has been discovered that the required small amount of catalyst may be mixed with coating composition and applied from the supply trough 20 by the first coating roll 14. As the selected sheet article passes therebeneath, the roll 14 applies to the top sheet surface a relatively thin layer or mass, i.e. about 2–4 mils, of coating composition containing the catalyst. The coating mixture, in the absence of any accelerator, has an entirely adequate pot life and the supply of mixture may be held substantially constant in the trough 20 from a feed tank of any conventional type. Thereafter, the layer-containing sheet is passed beneath the second coating roll 16 and a second layer applied thereto. This second layer is fed to the roll 16 from the supply trough 22 and comprises an intimate mixture of coating composition and the required small amount of accelerator or promoter. The second layer is preferably of a thickness comparable to the first-applied layer although it may be thicker or thinner as desired. Quite unexpectedly, two developments were discovered to result from this two-step roll coating method. First, the catalyst and accelerator were found to completely intermingle and to promote the desired fast cure in the applied coating composition. Second, there was no appreciable pick up of catalyst by the second coating roll 16 from the first layer applied to the sheet. These two factors permit extremely wide variations in the coating procedure which have not heretofore been possible with known apparatus. For example, it is now possible to employ coating mixtures having otherwise entirely undesirably short pot life and short curing cycles. It is also permissible and sometimes desirable to employ thixotropic agents which are difficult or impossible to use in spraying equipment.

In the novel method, a wide variety of coating compositions may be employed. One broad class embraces coatings of the so-called polyester (unsaturated alkyd) resins. These materials require catalysis with organic peroxides, diisocyanates, or other specific catalysts or combinations of catalysts and accelerators or promoters. Epoxide-type coatings form another large class of catalyzed coatings which may be applied by the present method. In general, any resinous coating which requires catalysis and acceleration to promote quick curing may be employed in the novel method of the invention. These compositions include, as well as those mentioned hereinbefore, the urea-aldehyde type, furan type, melamine-aldehyde type, triazine-aldehyde type, vinyl butyral and the like coatings which may require baking or which may be air cured. It should be emphasized that usually the coating agent will be a non-air inhibited material requiring no further treatment than normal drying. However, where use is made of an air inhibited coating material, the applied film may thereafter be covered with an impervious sheet such as cellophane, glassine, or the like and cured in the absence of air.

In the following illustrative example, a typical commercial non-air inhibited unsaturated polyester resin was mixed with various amounts of catalyst and accelerator in order to determine the time required for gelling. The resin was mixed as though it were to be employed with the heretofore described roll coating apparatus. Polylite 8027, manufactured by Reichhold Chemical Co., is a typical liquid unsaturated polyester resin which may be used in the coating operations.

Resin A (usually applied by the first coating roll) contained 100 parts of unsaturated polyester resin and 8 parts of catalyst (50% paste of benzoyl peroxide in tricresyl phosphate). All parts are by weight.

Resin B (usually applied by the second coating roll) contained 100 parts of unsaturated polyester resin, and 1.6 parts of dimethyl aniline as accelerator. All parts are by weight.

| Resin mixture, parts: | Gel time, minutes |
|---|---|
| A–20, B–100 | 5 |
| A–10, B–100 | 7 |
| A–5, B–100 | 12 |
| A–2, B–100 | 32 |
| A–1, B–100 | 60 |

A sample removed from the second coating roll during a commercial coating operation had not gelled after a period of two weeks at room temperature. From this comparison of gel times for the various mixtures it is apparent that the second coating roll picks up much less than 0.08 part of catalyst for each 100 parts of the resin itself. This is so because the mixture of 100 parts of resin B and 1 part resin A contained 0.08 part of catalyst and had a gel time of 60 minutes. It is therefore clear that in the novel method the pot life of the second resin mixture is not appreciably affected by any pickup of catalyst from the first-applied film. Furthermore, in the method described, the curing period is approximately only 16 minutes to the discharge end of the conveyor. Inasmuch as the coated sheets may then be handled without sticking, scratching, etc., it will be appreciated that the catalyst and accelerator are thoroughly intermingled and promote adequate cure in the resin. Thus it will be seen that the selected resinous coatings, requiring both catalysis and acceleration, may be applied as two separate films which intermingle thoroughly and quickly to promote complete curing of the coatings.

As hereinbefore stated, various commercially available thixotropic agents, i.e. various types of colloidal silica, may be employed in the novel method of the invention. Some of these agents are added to the resin to be applied by the first coating roll. Other thixotropic agents are combined in the resins by the manufacturers. However, it has been found that such flow inhibiting materals should not be included in the resin applied by the second coating roll. The presence of thixotrope in the second film greatly retards intermingling of the two films and, consequently, seriously impairs curing of the resinous coating. Accordingly, it is an important feature of the invention that the presence of a thixotropic agent be confined to the film of coating applied by the first roll.

It is to be understood that although the novel method of the present invention has been described with particular reference to a roll type coating apparatus, the method may also be carried out by equivalent mechanical means such as, for example knife coating apparatus, the newly developed pressurized apparatus which applies a thin curtain of coating composition to a traveling sheet passing therebeneath, and the like coating apparatuses.

The invention therefore presents to the art a novel and greatly improved method for the application of the above described class of resinous coating compositions. The method is easily carried out, productive of desirable coating film appearance, and represents a decided advance in the field of coating applications.

I claim:

1. A method of applying and curing a film of an organic liquid coating composition of unsaturated polyester resin which exhibits substantially no film-forming properties until mixed with a small amount of an appropriate catalyst and an accelerator therefor which comprises applying to the surface of a selected sheet material by means of a first roll applicator a first layer of liquid unsaturated polyester coating composition containing a small amount of a catalyst, immediately thereafter applying to the sheet by means of a second roll applicator a second layer of additional liquid unsaturated polyester coating composition containing a small amount of an accelerator, and then traveling the coated sheet for a period of time sufficient for the catalyst of said first layer and the accelerator of second layer to intermingle and to promote fast cure of the unsaturated polyester resin in the deposited layers of the coated sheet, said deposited liquid layers each being about 2–4 mils thick.

2. A method of applying and curing a film of an organic liquid coating composition of unsaturated polyester resin which exhibits substantially no film-forming properties until mixed with a small amount of an appropriate catalyst and a similarly small amount of an accelerator therefor, which mixture thereupon develops its film-forming properties within a period of from about five minutes to about twenty minutes, which comprises applying to the surface of a selected sheet material a first layer of liquid unsaturated polyester resin coating composition containing a small amount of a catalyst, immediately thereafter applying to the sheet a second layer of liquid unsaturated polyester resin coating composition containing a small amount of accelerator, and then traveling the coated sheet for a period of time sufficient for the catalyst of said first liquid layer and the accelerator of said second liquid layer to intermingle and to promote fast cure of liquid the unsaturated polyester resin in the deposited layers of the coated sheet, said deposited layers each being about 2–4 mils thick.

3. A method of applying and curing a film of an organic liquid coating composition of unsaturated polyester resin which exhibits substantially no film-forming properties until mixed with a small amount of an appropriate catalyst and a similarly small amount of an accelerator therefor, which mixture thereupon develops its film-forming properties within a period of time of from about five minutes to about twenty minutes, which comprises applying to the surface of a selected sheet material a first layer of liquid unsaturated polyester resin coating composition containing a small amount of catalyst, immediately thereafter applying to the sheet a second layer of liquid unsaturated polyester resin coating composition containing a small amount of accelerator, and then traveling the sheet with the coated surface for a period of about five to twenty minutes and thereby enabling the catalyst and accelerator in the layers to intermingle and to promote fast cure of the unsaturated polyester resin in the two layers, said deposited layers each being about 2–4 mils thick.

4. A method of applying and curing a film of an organic liquid coating composition of unsaturated polyester resin which exhibits substantially no film-forming properties until mixed with a small amount of an appropriate catalyst and a similarly small amount of an accelerator therefor, which mixture thereupon develops its film-forming properties within a period of time of from about five minutes to about twenty minutes, which comprises applying to the surface of a selected sheet material a first layer of the liquid unsaturated polyester resin coating composition containing a small amount of catalyst, said first layer being about 2–4 mils thick, immediately thereafter applying to the sheet a second layer of liquid unsaturated polyester resin coating composition containing a small amount of accelerator and then traveling the coated sheet for a period of time sufficient for the catalyst of said first layer and the accelerator of said second layer to intermingle and to promote fast cure of the unsaturated polyester resin in the deposited layers of the coated sheet.

References Cited in the file of this patent

UNITED STATES PATENTS

| | | |
|---|---|---|
| 2,460,998 | Nelson | Feb. 8, 1949 |
| 2,753,276 | Brochhagen | July 3, 1956 |
| 2,756,150 | Griggs et al. | July 24, 1956 |
| 2,772,184 | Wolfe et al. | Nov. 27, 1956 |
| 2,786,716 | Peeps | Mar. 26, 1957 |
| 2,787,314 | Anderson | Apr. 2, 1957 |
| 2,813,751 | Barrett | Nov. 19, 1957 |
| 2,817,619 | Bickel et al. | Dec. 24, 1957 |
| 2,902,389 | Keil | Sept. 1, 1959 |
| 2,927,867 | Hings | Mar. 8, 1960 |
| 2,929,794 | Simon et al. | Mar. 22, 1960 |
| 2,950,997 | Halacsy | Aug. 30, 1960 |

FOREIGN PATENTS

| | | |
|---|---|---|
| 1,025,302 | Germany | Feb. 27, 1958 |